(No Model.)
M. F. TAINTOR.
FLEXIBLE AND COLLAPSIBLE MUD GUARD FOR CYCLES.
No. 508,782. Patented Nov. 14, 1893.
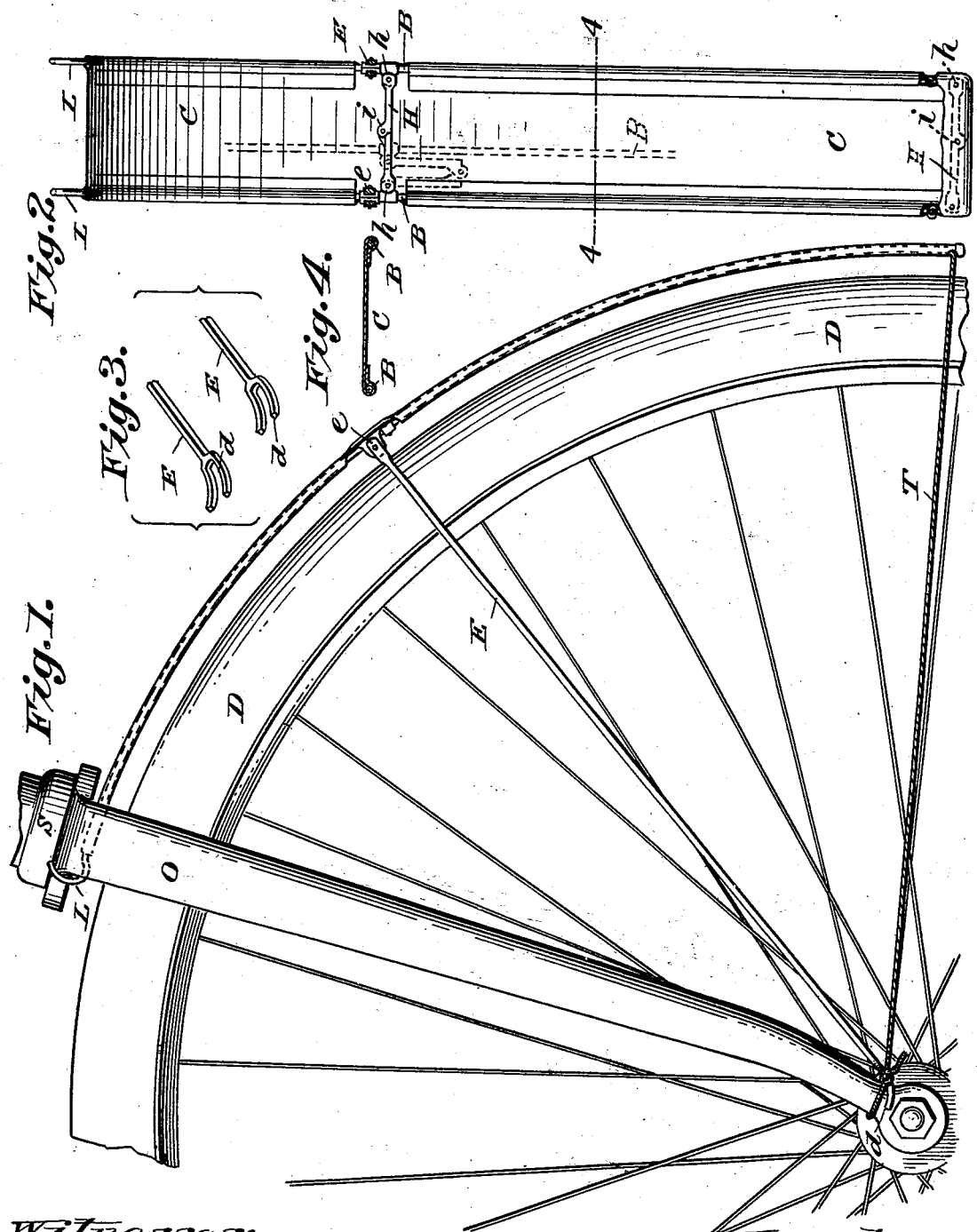

United States Patent Office.

MYRON F. TAINTOR, OF EASTHAMPTON, ASSIGNOR TO THE WARWICK CYCLE MANUFACTURING COMPANY, OF SPRINGFIELD, MASSACHUSETTS.

FLEXIBLE AND COLLAPSIBLE MUD-GUARD FOR CYCLES.

SPECIFICATION forming part of Letters Patent No. 508,782, dated November 14, 1893.

Application filed May 2, 1893. Serial No. 472,736. (No model.)

*To all whom it may concern:*

Be it known that I, MYRON F. TAINTOR, a citizen of the United States, residing at Easthampton, in the county of Hampshire and State of Massachusetts, have invented new and useful Improvements in Flexible and Collapsible Mud-Guards for Velocipedes, of which the following is a specification.

This invention relates to mud-guards for velocipedes and analogous vehicles, and the invention consists in the peculiar construction and arrangement of the several parts thereof all as hereinafter fully described and more particularly pointed out in the claims.

My improvements relate, in brief, to a flexible web confined to, and extended between two elastic side bars, transverse braces to hold the side bars apart and so distend the web, suitable means or members at one end of each of the side bars for attaching them to the fork or other suitable part of the velocipede, stays or brace rods connected to intermediate parts of the side bars, which by their inner ends are to have engagements with suitable supporting parts of the vehicle, and cords at the other ends of the side bars for constraining said bars and web to the contour of the wheel; the whole preferably being constructed with reference to capabilities for collapsing so that when not in use the mud guard may be compactly disposed in the general form of a rod, so that it may be secured alongside the "reach" or backbone, or other substantially straight member of the frame.

My invention is fully illustrated in the accompanying drawings, in which—

Figure 1 is a side elevation of a portion of a velocipede, showing my device combined therewith. Fig. 2 is an interior plan view of my device in partial section. Fig. 3 is a detail view, and Fig. 4 is a cross section on the dotted line 4, 4, of Fig. 2.

Referring to the drawings, B, B, are two rods or bars of corresponding size and of a length approximately that of the segment of a quadrant of the wheel, D, and formed of metal, whalebone, or other material combining the requisite elasticity and strength.

Secured to bars, B B, at its edges, as shown in Figs. 2 and 4, is a flexible web, C, of a a width equal to the diameter of the tire of wheel, D. The web, C, may be formed of rubber, woven fabric, or membrane, its function being to intercept flying mud from the wheel D.

Preferably upon the under side of web, C, to conceal them from view, are two braces, H H, extending transversely to the web and hinged at opposite ends at *h, h*, to the bars B B, so that when at right angles to the bars, and arranged at an interval apart, as shown in Fig. 2, the web will be distended between the bars its entire length.

As an improved means of forming a rigid frame of the side bars B B, and braces, H H, when the web is distended, as seen in Fig. 2, I form articulate joints, *i, i*, in the braces, H H, breaking in opposite directions, as shown in full and dotted lines, in the same view, so that no other fastening is needed to retain the side-bars in their proper relative position, and so that upon breaking the joints, *i, i*, as indicated in one brace, H, in dotted lines Fig. 2, the side-bars, B B, from their distended position, can approach each other, as indicated in dotted lines in the same view; I thus form a collapsible frame whose rigidity in distending the web is independent of its manner of attachment to the machine.

The bars, B B, at their upper ends are extended to form hooks, L L, adapted to pass through the fork, O, beneath the post, S, and hook to a surface above them, as shown in Fig. 1, and in that position holding the web, C, immediately above the wheel and a short distance removed therefrom. Hinged to the bars, B, B, near their longitudinal center at *e, e*, are two stiff braces, E E, provided upon their free ends with hooks, *d, d*, adapted to bear upon the lower ends of the fork upon each side of the wheel and near its axle.

The lower end of the guard is provided with one or more cords, T, secured to one or both of bars, B, and of a length sufficient to extend to the bottom of the fork near the hub and be attached thereto.

In adjusting the guard to its operative position, as shown in Fig. 1, the web distended as seen in Fig. 2, has the hook end of its frame inserted through the fork to have the hooks catch in a bend of the fork or other surface above them, the bars, B B, are bent to cause the hook ends of the braces, E E, to come to a bearing on the fork near the wheel axis, and a cord, T, is employed to compress the lower end of the guard to hold the braces, E E, to their seats and impart a curve to the guard concentric to the wheel, D, the free end of the cord being then made fast to the bottom of the fork to hold the guard in position.

When the guard is not needed, the cord is released to permit it to be easily detached, and, when removed, the braces, H H, are bent inward upon their hinges, i, i, to permit the bars, B B, to lie close together side by side, in which position they can be wrapped in the slack of the web to form a compact bundle adapted to be secured alongside of any part of the frame by the cord, T, forming part of the device.

Without a departure from the spirit of my invention, the braces, H H, for distending the web between the bars, B B, may be varied in form from that shown, while preserving the essential feature of permitting the frame, of which they form part, to be collapsible.

Now, having described my invention, what I claim is—

1. A mud-guard for a velocipede comprising opposite pairs of longitudinal elastic side bars, the flexible web secured to, and extended between said side bars, members at or near one end of the guard adapted for connection with a suitable supporting part of the velocipede, one or more arms or stay-rods having their outer ends hinged to intermediate parts of the said rods, and adapted by their inner ends to have supporting engagements with the velocipede, and cords connected to the other ends of the said elastic bars for drawing them and the web supported thereby to conform to the contour of the wheel, substantially as described.

2. A mud-guard for a velocipede comprising opposite pairs of longitudinal elastic side bars, the flexible web, secured to, and extended between said side bars, transverse brace sections hinged to each other and to said bars, the arms or stay-rods, E, hinged to intermediate portions of the side bars, and the cords, T, connected to the extremities of the side bars at one end of the guard, substantially as and for the purpose set forth.

3. A mud guard for velocipedes consisting of a strip of fabric, substantially as described, two parallel, flexible bars attached to the edges of said fabric each having a hook at one end for engagement with a part of the machine adjacent to the upper edge of the wheel, articulated cross-braces extending between said strips and hinged thereto beneath said fabric, a brace pivoted by one end to, and extending from, each of said strips, and having a fork-like engagement with a part of the wheel-fork near its lower extremity, and a cord attached to one end of said guard and adapted to be secured to the lower end of said wheel-fork, combined and operating substantially as set forth.

MYRON F. TAINTOR.

Witnesses:
H. A. CHAPIN,
K. I. CLEMONS.